US009389127B2

(12) United States Patent
Kameyama et al.

(10) Patent No.: US 9,389,127 B2
(45) Date of Patent: Jul. 12, 2016

(54) SEMICONDUCTOR DEVICE AND TEMPERATURE SENSOR SYSTEM

(75) Inventors: Tadashi Kameyama, Kanagawa (JP); Takanobu Naruse, Kanagawa (JP); Takayasu Ito, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 835 days.

(21) Appl. No.: 13/612,656

(22) Filed: Sep. 12, 2012

(65) Prior Publication Data

US 2013/0073240 A1    Mar. 21, 2013

(30) Foreign Application Priority Data

Sep. 20, 2011   (JP) .................................. 2011-204243

(51) Int. Cl.
*G01K 7/01*    (2006.01)
*G01K 1/00*    (2006.01)
*G01K 15/00*   (2006.01)
*G01K 7/00*    (2006.01)

(52) U.S. Cl.
CPC .. *G01K 7/01* (2013.01); *G01K 1/00* (2013.01); *G01K 15/00* (2013.01); *G01K 7/00* (2013.01)

(58) Field of Classification Search
CPC .......................... G01K 7/42; G01K 2007/422
USPC ............ 702/65, 130; 327/512, 513, 534, 535, 327/537, 539, 540, 541
See application file for complete search history.

(56) References Cited

U.S. PATENT DOCUMENTS

| 5,723,998 | A  |   | 3/1998 | Saito et al. |
| 7,661,878 | B1 | * | 2/2010 | Lall et al. ...................... 374/170 |
| 7,782,119 | B2 |   | 8/2010 | Kameyama et al. |
| 2005/0093618 | A1 | * | 5/2005 | Kobayashi ............... G01K 7/00 327/538 |

(Continued)

FOREIGN PATENT DOCUMENTS

| JP | 8-55963 A | 2/1996 |
| JP | 2002-13986 A | 1/2002 |

(Continued)

OTHER PUBLICATIONS

Office Action issued Apr. 1, 2015, in Chinese Patent Application No. 201210318974.5.

*Primary Examiner* — Gregory J Toatley
*Assistant Examiner* — Christine Liao
(74) *Attorney, Agent, or Firm* — Shapiro, Gabor and Rosenberger, PLLC

(57) ABSTRACT

A temperature sensor in a semiconductor device includes a temperature detection circuit for outputting a voltage according to the chip temperature, a reference voltage generating circuit for generating a plurality of reference voltages, and a plurality of voltage comparators for comparing each reference voltage with an output voltage of the temperature detection circuit and thereby generating a chip temperature detection signal configured with multiple bits. Further, the temperature sensor includes a control circuit for controlling the reference voltages generated by the reference voltage generating circuit based on the chip temperature detection signal and thereby changing correspondence between the chip temperature detection signal and the chip temperature to shift a chip temperature detection range. It is possible to expand the chip temperature detection range by changing the correspondence between the chip temperature detection signal and the chip temperature, without increasing the number of voltage comparators.

11 Claims, 11 Drawing Sheets

(56) References Cited

U.S. PATENT DOCUMENTS

| | | | |
|---|---|---|---|
| 2006/0256494 A1* | 11/2006 | Mori | H01L 27/0248 361/103 |
| 2008/0022140 A1 | 1/2008 | Yamada et al. | |
| 2009/0295457 A1* | 12/2009 | Mowry et al. | 327/512 |
| 2010/0142287 A1* | 6/2010 | Janzen et al. | 365/189.05 |

FOREIGN PATENT DOCUMENTS

| | | |
|---|---|---|
| JP | 2004-006473 A | 1/2004 |
| JP | 2009-152311 A | 7/2009 |
| JP | 2009-289795 A | 12/2009 |

* cited by examiner

SEMICONDUCTOR DEVICE AND TEMPERATURE SENSOR SYSTEM

CROSS-REFERENCE TO RELATED APPLICATIONS

The disclosure of Japanese Patent Application No. 2011-204243 filed on Sep. 20, 2011 including the specification, drawings and abstract is incorporated herein by reference in its entirety.

BACKGROUND

The present invention relates to a semiconductor device and a temperature sensor system, and in particular, relates to a technique for suppressing an increase in the number of voltage comparators with an expansion in the chip temperature detection range of a temperature sensor.

Japanese Unexamined Patent Publication No. 2009-289795 (Patent Document 1) describes a semiconductor integrated circuit that incorporates functional modules of large operating current and a temperature detection circuit for detecting a chip temperature and is capable of external temperature control or temperature monitoring less affected by system board noise.

Japanese Unexamined Patent Publication No. 2004-6473 (Patent Document 2) describes a semiconductor integrated circuit having a functional circuit on a semiconductor substrate, a temperature detecting element for detecting the temperature of the functional circuit, and a control circuit for controlling the temperature of the functional circuit.

When the temperature of the functional circuit is lower than the minimum operating temperature of the function, the control circuit performs control so as to operate part or all of the functional circuit to increase the temperature of the functional circuit and inhibit external output of the functional circuit.

Japanese Unexamined Patent Publication No. Hei 8(1996)-55963 (Patent Document 3) describes an integrated circuit in which temperature data detected by a temperature sensor is sent to a clock/peripheral control circuit, and the clock/peripheral control circuit compares the temperature data with the upper and lower limits of an operating temperature range held in a temperature setting circuit, and decrease a clock frequency and stops a cache operation if the temperature is out of the range.

Japanese Unexamined Patent Publication No. 2009-152311 (Patent Document 4) describes a semiconductor integrated circuit system in which a source voltage determination circuit estimates performance with the worst operating condition from a temperature measured by a temperature sensor, and determines a new source voltage of a semiconductor integrated circuit based on a conversion table.

SUMMARY

In a system LSI as an example of the semiconductor integrated circuit, when a chip temperature rises to a critical temperature close to 398K. (125° C.), increases in standby leakage current and rises in the chip temperature of the LSI are repeated endlessly, which causes thermal runaway. Therefore, a temperature sensor is incorporated into the chip of the system LSI to monitor the chip temperature, and the operation rate of the system LSI is decreased at the time of a rise in chip temperature.

For example, in Patent Document 1, before a power supply circuit 3 stops the supply of an internal operating source voltage to a central processing unit 11 at the time of an excessive temperature of the chip, an operation rate controller 14 decreases the operation rate of the central processing unit 11 in stages in response to rises in chip temperature. The decrease in the operation rate of the central processing unit 11 is achieved by multistage decrease in the frequency of an operation clock CL supplied from a PLL circuit 15 to the central processing unit 11. For the multistage control of the operation rate of the central processing unit 11, the operation rate controller 14 identifies, at multiple levels, the relationship between a temperature detection signal VTSEN and a reference signal VREF generated by a temperature detection circuit 10. For example, multiple reference levels VREF1, VREF2, VREF3, VREF4 are generated from a single reference signal VREF. The operation rate controller 14 identifies, at multiple levels, the relationship between the multiple reference levels VREF1, VREF2, VREF3, VREF4 and the temperature detection signal VTSEN. Voltage dividing resistors Rref1 to Rref5 are used to generate the reference levels VREF1, VREF2, VREF3, VREF4, and voltage comparators CP1 to CP4 are used to identify the relationship between the reference levels and the temperature detection signal.

The present inventors have studied the application of the temperature sensor described in Patent Document 1 to low-temperature detection in the semiconductor integrated circuit, particularly an improvement in the operation margin of a circuit module (simply referred to as "module") that has large temperature dependence at low temperatures, making it hard to secure a characteristic margin, and a correction to circuit operating characteristics by dynamically changing a circuit constant in accordance with the temperature dependence. According to the configuration of the temperature sensor described in Patent Document 1, the present inventors have found the following. Expanding a temperature detection range to a low temperature region such as −60° C. while maintaining a predetermined detection accuracy enormously increases the number of voltage comparators so that the chip occupation area of the temperature sensor cannot be neglected.

Patent Documents 2 to 4 do not take into account that expanding a chip temperature detection range to a low temperature region while maintaining a predetermined detection accuracy enormously increases the number of voltage comparators so that the chip occupation area of the temperature sensor cannot be neglected.

It is an object of the present invention to provide a technique for suppressing an increase in the number of voltage comparators with an expansion in a chip temperature detection range.

The above and other objects and novel features of the present invention will become apparent from the description of this specification and the accompanying drawings.

A typical aspect of the invention disclosed in the present application will be briefly described as follows.

A semiconductor device includes a temperature sensor for detecting a chip temperature and a module whose operation can be controlled based on an output of the temperature sensor. The temperature sensor includes a temperature detection circuit for outputting a voltage according to the chip temperature, a reference voltage generating circuit for generating a plurality of reference voltages, and a plurality of voltage comparators for comparing each reference voltage obtained by the reference voltage generating circuit with an output voltage of the temperature detection circuit and thereby generating a chip temperature detection signal configured with multiple bits. Further, the temperature sensor includes a control circuit for controlling the reference voltages generated by the reference voltage generating circuit based on the chip temperature detection signal and thereby changing correspondence between the chip temperature detection signal and the chip temperature to shift a chip temperature detection range. The control circuit controls the reference voltages so that parts of chip temperature detection ranges overlap each other around the shift of the chip temperature detection range.

An effect obtained by the typical aspect of the invention disclosed in the present application will be briefly described as follows.

It is possible to suppress an increase in the number of voltage comparators with an expansion in the chip temperature detection range.

DETAILED DESCRIPTION

1. Outline of Embodiments

Figure 1:
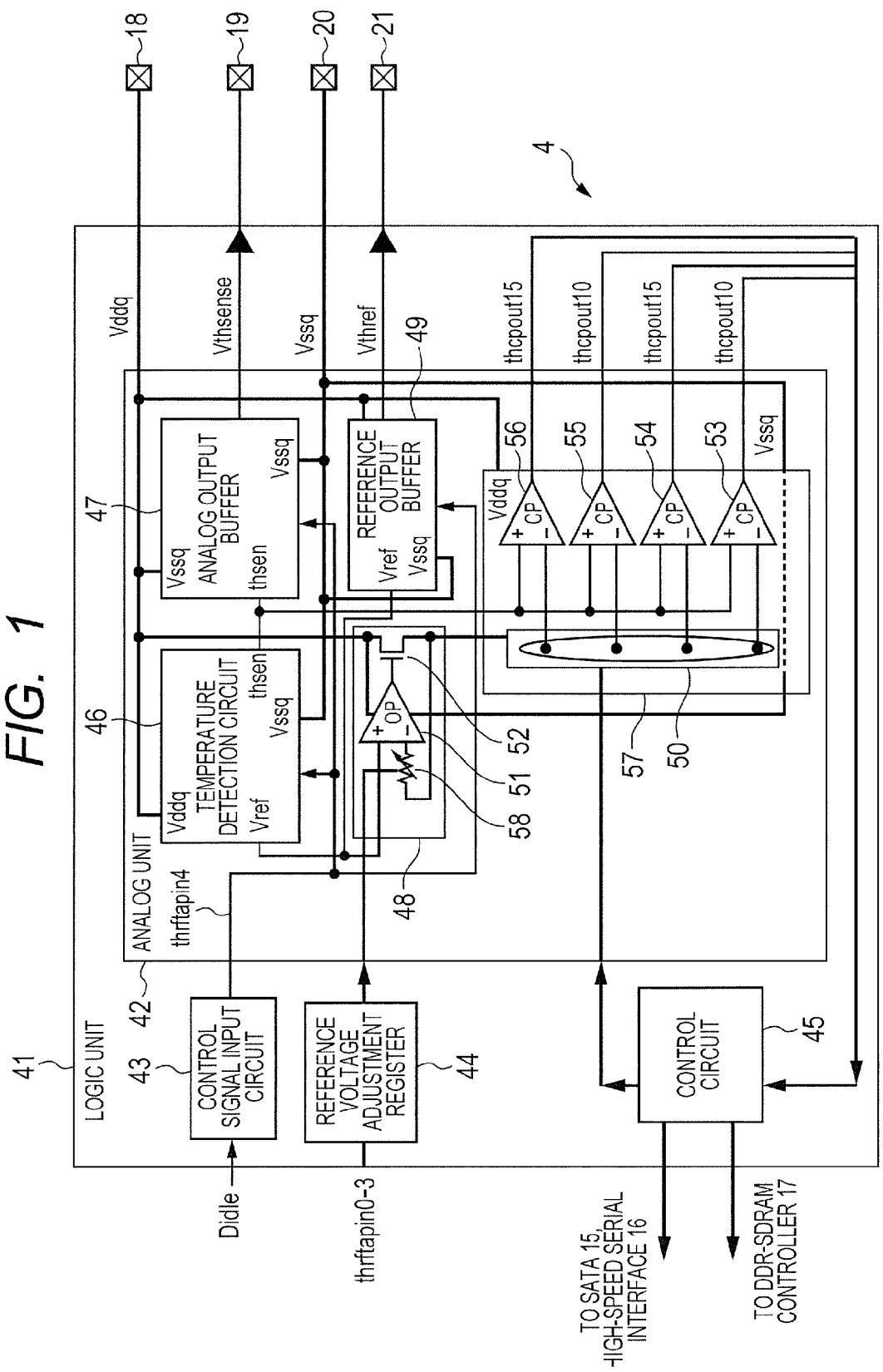
FIG. 1 is a block diagram showing a configuration example of a temperature sensor included in an LSI as an example of a semiconductor device according to the present invention.

First, exemplary embodiments of the invention disclosed in the present application will be outlined. Reference numerals in the drawings that refer to with parentheses applied thereto in the outline description of the exemplary embodiments are merely illustration of ones contained in the concepts of components marked with the reference numerals.

[1] A semiconductor device (semiconductor chip) (200) according to an exemplary embodiment of the invention includes a temperature sensor (4) for detecting a chip temperature (semiconductor device temperature) and a module (2, 6-17) whose operation can be controlled based on an output of the temperature sensor. The temperature sensor includes a temperature detection circuit (46) for outputting a voltage according to the chip temperature, a reference voltage generating circuit (50) for generating a plurality of reference voltages, and a plurality of voltage comparators (53 to 56) for comparing each reference voltage obtained by the reference voltage generating circuit with an output voltage of the temperature detection circuit and thereby generating a chip temperature detection signal configured with multiple bits. Further, the temperature sensor includes a control circuit (45) for controlling the reference voltages generated by the reference voltage generating circuit based on the chip temperature detection signal and thereby changing correspondence between the chip temperature detection signal and the chip temperature to shift a chip temperature detection range. The control circuit controls the reference voltages so that parts of chip temperature detection ranges overlap each other around the shift of the chip temperature detection range.

With the above configuration, the control circuit in the temperature sensor in the semiconductor device controls the reference voltages generated by the reference voltage generating circuit based on the chip temperature detection signal and thereby changes the correspondence between the chip temperature detection signal and the chip temperature to shift the chip temperature detection range, thereby enabling an expansion in the chip temperature detection range. Thus, it is possible to expand the chip temperature detection range by changing the correspondence between the chip temperature detection signal and the chip temperature, without increasing the number of voltage comparators. This makes it possible to suppress an increase in the chip occupation area of the temperature sensor with an expansion in the chip temperature detection range. Further, by controlling the reference voltages so that parts of chip temperature detection ranges overlap each other around the shift of the chip temperature detection range, it is possible to normally detect the chip temperature (Tj) that changes in the direction opposite to the shift direction immediately after the shift of the chip temperature detection range.

According to a specific embodiment of the semiconductor device, the control circuit includes a first register (451) for holding a reference voltage control signal for controlling the reference voltages and a second register (452) for holding the chip temperature detection signal. This makes it possible to temporarily hold the reference voltage control signal in the first register and temporarily hold the chip temperature detection signal in the second register. This is effective in facilitating the control operation of the control circuit.

According to another specific embodiment, the control circuit includes a third register (453) for outputting the reference voltage control signal and the chip temperature detection signal to the outside of the temperature sensor. Since it is possible to output the reference voltage control signal and the chip temperature detection signal to the outside of the temperature sensor through the third register, it is possible to correctly recognize the chip temperature based on the reference voltage control signal and the chip temperature detection signal even when the correspondence between the chip temperature detection signal and the chip temperature is changed to shift the chip temperature detection range.

According to another specific embodiment, the reference voltage generating circuit includes a plurality of resistors (301A, 301B, etc.) for dividing an input voltage and a switch for selecting a resistor (302 etc.) concerned in the division of the input voltage from among the resistors. Since the switch selects the resistor concerned in the division of the input voltage from among the resistors, it is possible to easily divide the input voltage.

According to another specific embodiment, the control circuit includes a switch control circuit (455) which increments or decrements a switch control signal for controlling an operation of the switch based on the chip temperature detection signal held in the second register. By providing the switch control circuit, it is possible to increment or decrement the switch control signal based on the chip temperature detection signal held in the second register.

According to another specific embodiment, the switch control circuit has a mask function for fixing a logic value of the signal sent from the second register only during a predetermined mask period, and increments or decrements the switch control signal during the mask period. With the mask processing, even if the information held in the second register is updated, the update of the information held in the second register is not reflected on the control of the switch control circuit during the predetermined mask period, which can stabilize the reference voltage control signal. The mask period can be set in consideration of a period until the first register is updated and the outputs of the voltage comparators become stabilized in accordance with the updated reference voltages.

According to another specific embodiment, the module includes a first module (15, 16) which receives the reference voltage control signal and the chip temperature detection signal through the third register and can trim an internal circuit based on the reference voltage control signal and the chip temperature detection signal. Since the first module receives the reference voltage control signal and the chip temperature detection signal through the third register, it is possible to easily trim the internal circuit based on the reference voltage control signal and the chip temperature detection signal.

According to another specific embodiment, the control circuit includes a low-temperature operation signal generating circuit (456) for generating a low-temperature operation signal based on the reference voltage control signal and the chip temperature detection signal, and the module includes a second module (17) which can perform a dummy operation for generating heat, in accordance with the low-temperature operation signal. The dummy operation of the second module can increase the chip temperature (Tj). When the chip temperature exceeds a predetermined temperature by the dummy operation, the operation mode of the second module can transition from the dummy operation to a different operation (normal operation). Therefore, even if the second module has large temperature dependence at low temperatures, it is possible to avoid an unstable operation of the second module at low temperatures.

According to another specific embodiment, the module includes a CPU (2) which receives the reference voltage control signal and the chip temperature detection signal through the third register, generates a predetermined interrupt signal based on the reference voltage control signal and the chip temperature detection signal, and can perform control for decreasing an operation rate in the semiconductor device in accordance with the interrupt signal. Since the CPU generates the predetermined interrupt signal based on the reference voltage control signal and the chip temperature detection signal and decreases the operation rate in the semiconductor device in accordance with the interrupt signal, it is possible to avoid thermal runaway of the semiconductor device.

According to another specific embodiment, the temperature sensor includes a reference voltage adjustment circuit (48) for fine-adjusting the reference voltages generated by the reference voltage generating circuit in accordance with a signal provided from the outside of the temperature sensor. With this, a user of the semiconductor device can fine-adjust the reference voltages through the reference voltage adjustment circuit in a user system incorporating the semiconductor device.

[2] A temperature sensor system (4) according to an exemplary embodiment of the invention can detect a chip temperature of a semiconductor device. The temperature sensor system includes a temperature detection circuit (46) for outputting a voltage according to the chip temperature and a reference voltage generating circuit (50) for generating a plurality of reference voltages. Further, the temperature sensor system (4) includes a plurality of voltage comparators (53 to 56) for comparing each reference voltage obtained by the reference voltage generating circuit with an output voltage of the temperature detection circuit and thereby generating a chip temperature detection signal configured with multiple bits. Further, the temperature sensor system (4) includes a control circuit (45) for controlling the reference voltages generated by the reference voltage generating circuit based on the chip temperature detection signal and thereby changing correspondence between the chip temperature detection signal and the chip temperature to shift a chip temperature detection range. The control circuit controls the reference voltages so that parts of chip temperature detection ranges overlap each other around the shift of the chip temperature detection range.

With the above configuration, the control circuit in the temperature sensor system controls the reference voltages generated by the reference voltage generating circuit based on the chip temperature detection signal and thereby changes the correspondence between the chip temperature detection signal and the chip temperature to shift the chip temperature detection range, thereby enabling an expansion in the chip temperature detection range. Thus, it is possible to expand the chip temperature detection range by changing the correspondence between the chip temperature detection signal and the chip temperature, without increasing the number of voltage comparators. This makes it possible to suppress an increase in the chip occupation area of the temperature sensor with an expansion in the chip temperature detection range. Further, by controlling the reference voltages so that parts of chip temperature detection ranges overlap each other around the shift of the chip temperature detection range, it is possible to normally detect the chip temperature (Tj) that changes in the direction opposite to the shift direction immediately after the shift of the chip temperature detection range.

2. Details of Embodiments

Embodiments will be described in greater detail below.

First Embodiment

Figure 2:
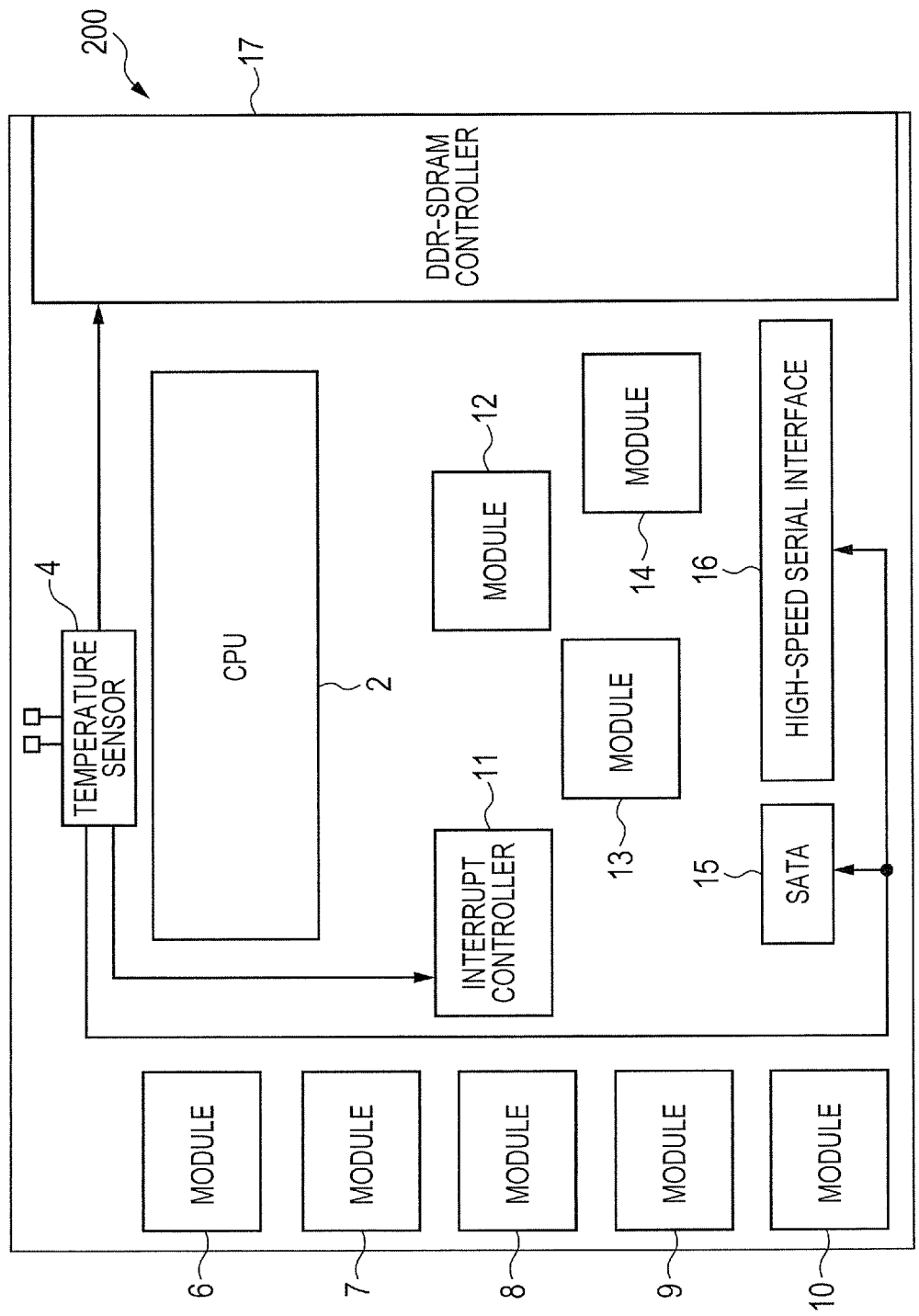
FIG. 2 is a block diagram of the LSI as an example of the semiconductor device according to the invention.

FIG. 2 shows an LSI (Large Scale Integration) as an example of a semiconductor device according to the invention.

Although not restricted, the LSI 200 shown in FIG. 2 is used in a car navigation system installed in a vehicle, and is formed over a single semiconductor substrate such as a monocrystalline silicon substrate, using a known semiconductor integrated circuit manufacturing technology. The LSI 200 includes a plurality of modules having predetermined functions and is formed as an Soc (System-on-a-chip). The modules include a CPU (central processing unit) 2 and a plurality of modules 6 to 17 as its peripheral circuits. The CPU 2 executes arithmetic processing based on a predetermined program. Although not shown, the CPU 2 can include one or more modules for executing the same arithmetic processing. Among the modules 6 to 17, the module 11 is an interrupt controller. The interrupt controller 11 receives an interrupt request from a peripheral circuit and asserts an interrupt signal supplied to the CPU 2. Further, among the modules 6 to 17, the module 15 is a SATA (Serial Advanced Technology Attachment) interface as an example of a high-speed serial interface, the module 16 is a high-speed serial interface other than SATA, and the module 17 is a DDR-SDRAM controller. The SATA interface 15 is an interface for coupling a magnetic drive, an optical drive, etc. The high-speed serial interface 16 is an interface corresponding to, for example, USB 3.0, PCI Express, etc. The DDR-SDRAM controller 17 is a controller for a DDR-SDRAM (Double-Data-Rate Synchronous Dynamic Random Access Memory) which is a memory that enables data exchange on the rising and falling edges of a clock signal. The DDR-SDRAM is disposed outside the LSI 200, and the operation thereof is controlled by the DDR-SDRAM controller 17.

In the LSI 200 shown in FIG. 2, a temperature sensor 4 for detecting a chip temperature is formed. In this example, the temperature sensor 4 is disposed near the CPU 2 which is prone to temperature rise. A temperature detection result by the temperature sensor 4 is sent to the interrupt controller 11, the SATA interface 15, the high-speed serial interface 16, and the DDR-SDRAM controller 17, for operation control.

For example, if an excessive temperature such as 125° C. or higher is detected by the temperature sensor 4, a predetermined interrupt request is made to the interrupt controller 11. When the CPU 2 performs interrupt processing according to the interrupt request, a power supply circuit disposed outside the LSI 200 is instructed to stop part or all of the supply of a source voltage to the CPU 2. When the supply of the source voltage to the CPU 2 is stopped, part or all of the operation of the CPU 2 is stopped, so that the chip temperature gradually decreases. If the temperature detection result by the temperature sensor 4 does not indicate an excessive temperature, the source voltage is supplied to part or all of the CPU 2 from the power supply circuit disposed outside the LSI 200.

The SATA interface 15 and the high-speed serial interface 16 incorporate trimming circuits for adjusting temperature-dependent characteristics respectively. In the SATA interface 15 and the high-speed serial interface 16, the incorporated trimming circuits perform trimming based on the temperature detection result by the temperature sensor 4, thereby correcting the temperature-dependent characteristics of the SATA interface 15 and the high-speed serial interface 16. The trimming circuits are formed with a plurality of resistors for trimming and switches for selectively engaging the terminals of the resistors in circuit operation based on the temperature detection result by the temperature sensor 4, and switching between the resistors can correct the temperature-dependent characteristics.

The DDR-SDRAM controller 17 is an example of a module having a small margin for low-temperature operation. It is desirable that the module having a small margin for low-temperature operation such as the DDR-SDRAM controller 17 is operated at temperatures, such as exceeding −20° C., higher than an outer surface guarantee temperature of e.g. −40° C. Therefore, in this example, the DDR-SDRAM controller 17 performs a dummy operation for generating heat if −40° C.<Tj<−20° C., based on a low-temperature operation signal outputted from the temperature sensor 4. The symbol "Tj" denotes the chip temperature. Then, when the chip temperature Tj exceeds −20° C. by the dummy operation, the dummy operation is stopped, and the DDR-SDRAM controller 17 performs an original control operation to enable the read/write of the DDR-SDRAM. In the dummy operation, signals are not inputted or outputted to/from the DDR-SDRAM controller 17. For example, it is effective as the dummy operation to generate a test pattern within the DDR-SDRAM controller 17 and send the test pattern to an internal logic in the DDR-SDRAM controller 17 to generate heat.

If the temperature does not exceed e.g. −20° C. only with the dummy operation of the DDR-SDRAM controller 17, another module is added for the dummy operation with necessary heat. When the temperature exceeds −20° C., the dummy operation including another module is stopped, and a normal operation is performed.

Next, the detailed configuration of the temperature sensor 4 will be described.

FIG. 1 shows a configuration example of the temperature sensor 4.

The temperature sensor 4 includes a logic unit 41 and an analog unit 42.

The logic unit 41 includes a control signal input circuit 43, a reference voltage adjustment register 44, and a control circuit 45.

The control signal input circuit 43 receives a Didle signal indicating an idle state and generates thrftapin4.

Figure 8:
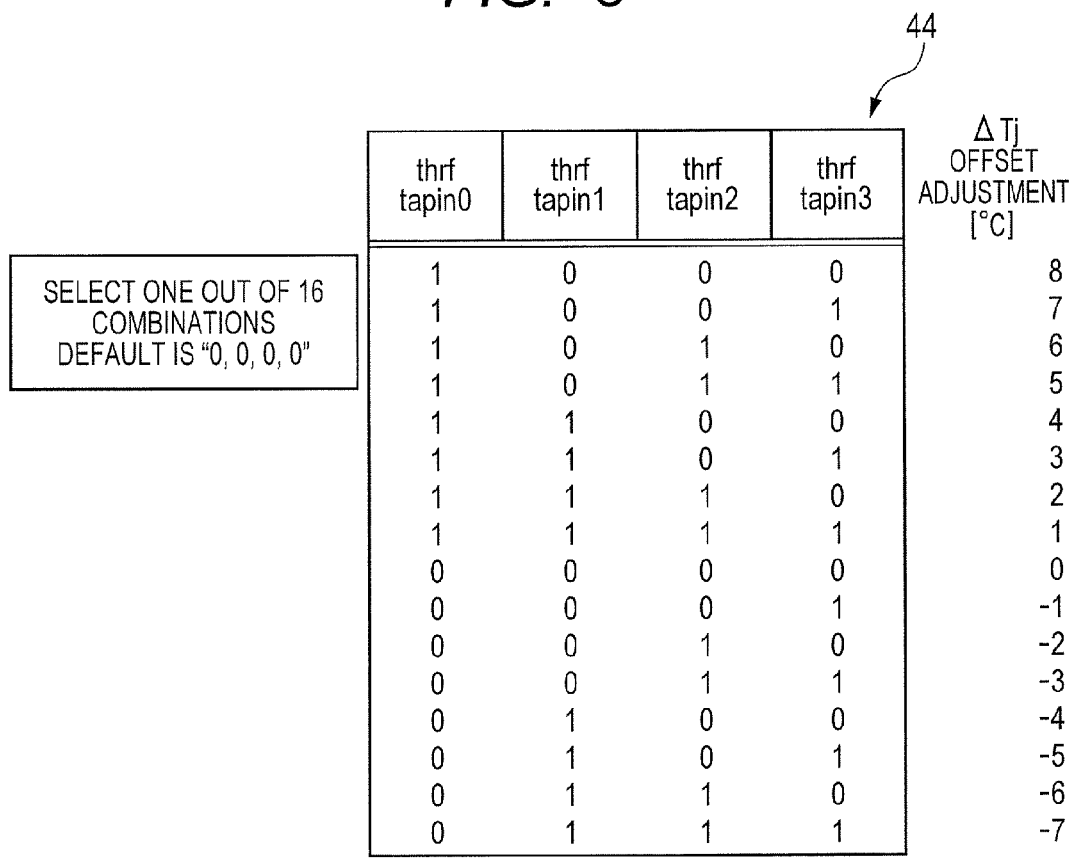
FIG. 8 is a diagram for explaining the function of a reference voltage adjustment register in the temperature sensor shown in FIG. 1.

The reference voltage adjustment register 44 is provided to hold a reference voltage adjustment signal thrftapin0-3 from a user system incorporating the LSI 200. With the reference voltage adjustment signal thrftapin0-3 held in the reference voltage adjustment register 44, it is possible to fine-adjust a reference voltage. For example as shown in FIG. 8, the reference voltage adjustment signal thrftapin0-3 provides 16 combinations, which are assigned offset adjustment values in chip temperature detection. By arbitrarily selecting from among the 16 combinations of the reference voltage adjustment signal thrftapin0-3 and setting it in the reference voltage adjustment register 44, it is possible to fine-adjust the reference voltage. In this example, by fine-adjusting the reference voltage, the offset adjustment of chip temperature detection can be performed in units of 1° C. The default value of the reference voltage adjustment signal thrftapin0-3 is "0, 0, 0, 0".

To suppress an increase in the chip occupation area of the temperature sensor with an expansion in a chip temperature detection range, the control circuit 45 has the function of controlling the reference voltage based on a chip temperature detection signal and thereby changing the correspondence between the bits of the chip temperature detection signal and the chip temperature to shift the chip temperature detection range. Thus, it is possible to expand the chip temperature detection range by shifting the chip temperature detection range.

The detailed configuration of each unit in the logic unit 41 will be detailed later.

The analog unit 42 includes a temperature detection circuit 46, an analog output buffer 47, a reference voltage adjustment circuit 48, a reference output buffer 49, and a chip temperature detection signal generating circuit 57.

The temperature detection circuit 46 generates a temperature detection signal thsen in accordance with the chip temperature of the LSI 200, and generates a reference voltage Vref to reduce the influence of noise. For example, a circuit described in Patent Document 1 (paragraphs [0077] to [0086]) can be applied to the temperature detection circuit 46. The temperature detection circuit 46 operates at a high-potential-side source voltage Vddq with respect to a low-potential-side source voltage Vssq. The high-potential-side source voltage Vddq and the low-potential-side source voltage Vssq are supplied from outside the LSI 200 through external terminals 18 and 20 provided on the LSI 200. The output signal thrftapin4 of the control signal input circuit 43 is sent to the temperature detection circuit 46. The temperature detection circuit 46 is activated when the output signal thrftapin4 of the control signal input circuit 43 is at a high level. At this time, the temperature detection signal thsen and the reference voltage Vref are generated. When the Didle signal becomes the high level, the output signal thrftapin4 of the control signal input circuit 43 becomes a low level, and the temperature detection signal thsen and the reference voltage Vref are not generated.

The analog output buffer 47 receives the output of the temperature detection circuit 46, and outputs a temperature detection result analog signal Vthsense. The temperature detection result analog signal Vthsense is outputted to the outside of the LSI 200 through an external terminal 19 of the LSI 200. The analog output buffer 47 is activated when the output signal thrftapin4 is at the high level. At this time, the temperature detection result analog signal Vthsense is outputted to the outside of the LSI 200 through the external terminal 19. The analog output buffer 47 is deactivated when the output signal thrftapin4 is at the low level. At this time, the temperature detection result analog signal Vthsense is not outputted to the outside of the LSI 200.

The reference voltage adjustment circuit 48 fine-adjusts the reference voltage inputted to the chip temperature detection signal generating circuit 57 in accordance with information set in the reference voltage adjustment register 44. Although not restricted, the reference voltage adjustment circuit 48 includes a variable resistor circuit 58, an operational amplifier (OP) 51, and an N-channel MOS transistor 52. The operational amplifier 51 is supplied with the high-potential-side source voltage Vddq and the low-potential-side source voltage Vssq as operating source voltages. The reference voltage Vref outputted from the temperature detection circuit 46 is supplied to the non-inverting input terminal (+) of the operational amplifier 51. The variable resistor circuit 58 includes a plurality of resistors for dividing the output voltage of the reference voltage adjustment circuit 48 and switches for changing the division ratio of the resistors in accordance with the information set in the reference voltage adjustment register 44. A voltage divided by the variable resistor circuit 58 is supplied to the inverting input terminal (−) of the operational amplifier 51.

The reference output buffer 49 is provided to output the reference voltage Vref outputted from the temperature detection circuit 46 as Vthref to the outside of the LSI 200. The reference output buffer 49 is activated when the output signal thrftapin4 is at the high level. At this time, the reference voltage Vref is outputted to the outside of the LSI 200 through an external terminal 21 of the LSI 200. The reference output buffer 49 is deactivated when the output signal thrftapin4 is at the low level. At this time, the reference voltage Vref is not outputted to the outside of the LSI 200.

The chip temperature detection signal generating circuit 57 is provided to generate the chip temperature detection signal thcpout0, thcpout5, thcpout10, thcpout15 (abbreviated as "thcpout0-15") configured with multiple bits representing the chip temperature. The chip temperature detection signal generating circuit 57 includes a reference voltage generating circuit 50 for generating a plurality of reference voltages and a plurality of voltage comparators (CP) 53 to 56 for comparing each reference voltage obtained by the reference voltage generating circuit 50 with the temperature detection voltage thsen of the temperature detection circuit 46 and thereby generating the chip temperature detection signal thcpout0-15 configured with multiple bits representing the chip temperature. The temperature detection signal thsen of the temperature detection circuit 46 is supplied to the non-inverting input terminals (+) of the voltage comparators 53 to 56. The reference voltages of the reference voltage generating circuit 50 are supplied to the inverting input terminals (−) of the voltage comparators 53 to 56, respectively. The temperature detection signal thsen of the temperature detection circuit 46 and the reference voltages of the reference voltage generating circuit 50 have a common reference level of the low-potential-side source voltage Vssq.

The voltage of the temperature detection signal thsen varies depending on the temperature (e.g., 1.7 mV/° C.). Assuming that the noise level of the temperature detection signal thsen actually ranges between ±10 and ±50 mV, an error of ±5.5 to ±37.7° C. occurs only by the noise of the temperature detection signal thsen unless the noise is canceled. In this example, since the temperature detection signal thsen of the temperature detection circuit 46 and the reference voltages of the reference voltage generating circuit 50 have a common reference level of the low-potential-side source voltage Vssq, the noise is canceled by the function of common mode rejection by the differential amplification operation of the voltage comparators 53 to 56, it is possible to obtain a high-accuracy temperature detection result (chip temperature detection signal thcpout0-15).

Figure 3:
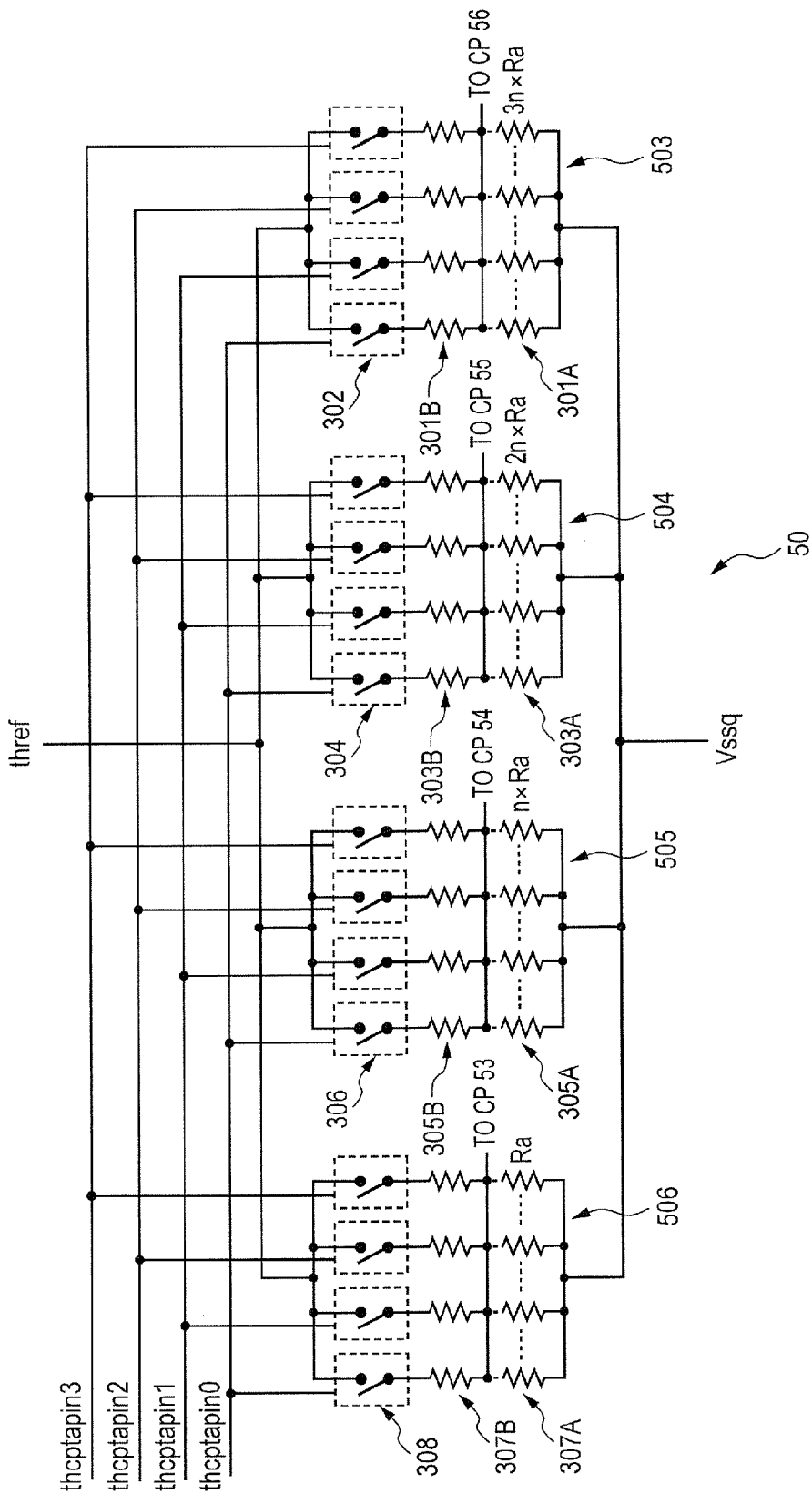
FIG. 3 is a circuit diagram showing a configuration example of a reference voltage generating circuit in the temperature sensor shown in FIG. 1.

FIG. 3 shows a configuration example of the reference voltage generating circuit 50.

The reference voltage generating circuit 50 includes four voltage generating units 503 to 506 disposed corresponding to the voltage comparators 53 to 56. The voltage generating units 503 to 506 are coupled between an output voltage thref of the reference voltage adjustment circuit 48 and the low-potential-side source voltage Vssq, and generate the reference voltages of predetermined levels respectively by dividing the output voltage thref of the reference voltage adjustment circuit 48 with respect to the low-potential-side source voltage Vssq.

The voltage generating unit 503 generates a reference voltage supplied to the inverting input terminal (−) of the voltage comparator 56. The voltage generating unit 503 includes a Vssq-side dividing resistor group 301A, a thref-side dividing resistor group 301B, and a switch group 302 for changing a division ratio by selectively engaging dividing resistors of the thref-side dividing resistor group 301B in circuit operation.

The voltage generating unit 504 generates a reference voltage supplied to the inverting input terminal (−) of the voltage comparator 55. The voltage generating unit 504 includes a Vssq-side dividing resistor group 303A, a thref-side dividing resistor group 303B, and a switch group 304 for changing a division ratio by selectively engaging dividing resistors of the thref-side dividing resistor group 303B in circuit operation.

The voltage generating unit 505 generates a reference voltage supplied to the inverting input terminal (−) of the voltage comparator 54. The voltage generating unit 505 includes a Vssq-side dividing resistor group 305A, a thref-side dividing resistor group 305B, and a switch group 306 for changing a division ratio by selectively engaging dividing resistors of the thref-side dividing resistor group 305B in circuit operation.

The voltage generating unit 506 generates a reference voltage supplied to the inverting input terminal (−) of the voltage comparator 53. The voltage generating unit 506 includes a Vssq-side dividing resistor group 307A, a thref-side dividing resistor group 307B, and a switch group 308 for changing a division ratio by selectively engaging dividing resistors of the thref-side dividing resistor group 307B in circuit operation.

Assuming that the value of each dividing resistor in the Vssq-side dividing resistor group 307A in the voltage generating unit 506 is denoted by "Ra", the value of each dividing resistor in the Vssq-side dividing resistor group 305A in the voltage generating unit 505 is denoted by "n×Ra", the value of each dividing resistor in the Vssq-side dividing resistor group 303A in the voltage generating unit 504 is denoted by "2n×Ra", and the value of each dividing resistor in the Vssq-side dividing resistor group 301A in the voltage generating unit 503 is denoted by "3n×Ra". The symbol "n" denotes a resistance ratio, and a temperature difference by the chip temperature detection signal thcpout0-15 is determined by the resistance ratio n. In this example, the resistance ratio n is determined so that the temperature difference by the chip temperature detection signal thcpout0-15 is 5° C.

The states of the switch groups 302 to 308 in the voltage generating units 503 to 506 are controlled by the control circuit 45. The reference voltages supplied to the voltage comparators 53 to 56 can be changed by the switch control. The correspondence between the bits of the chip temperature detection signal thcpout0-15 and the chip temperature is changed by changing the reference voltages supplied to the voltage comparators 53 to 56. In this example, the chip temperature detection range can be shifted in units of 15° C. in accordance with the states of the switch groups 302 to 308 in the voltage generating units 503 to 506. The operations of the switch groups 302 to 308 are controlled by a reference voltage control signal thcptapin0-3 outputted from the control circuit 45.

Figure 4:
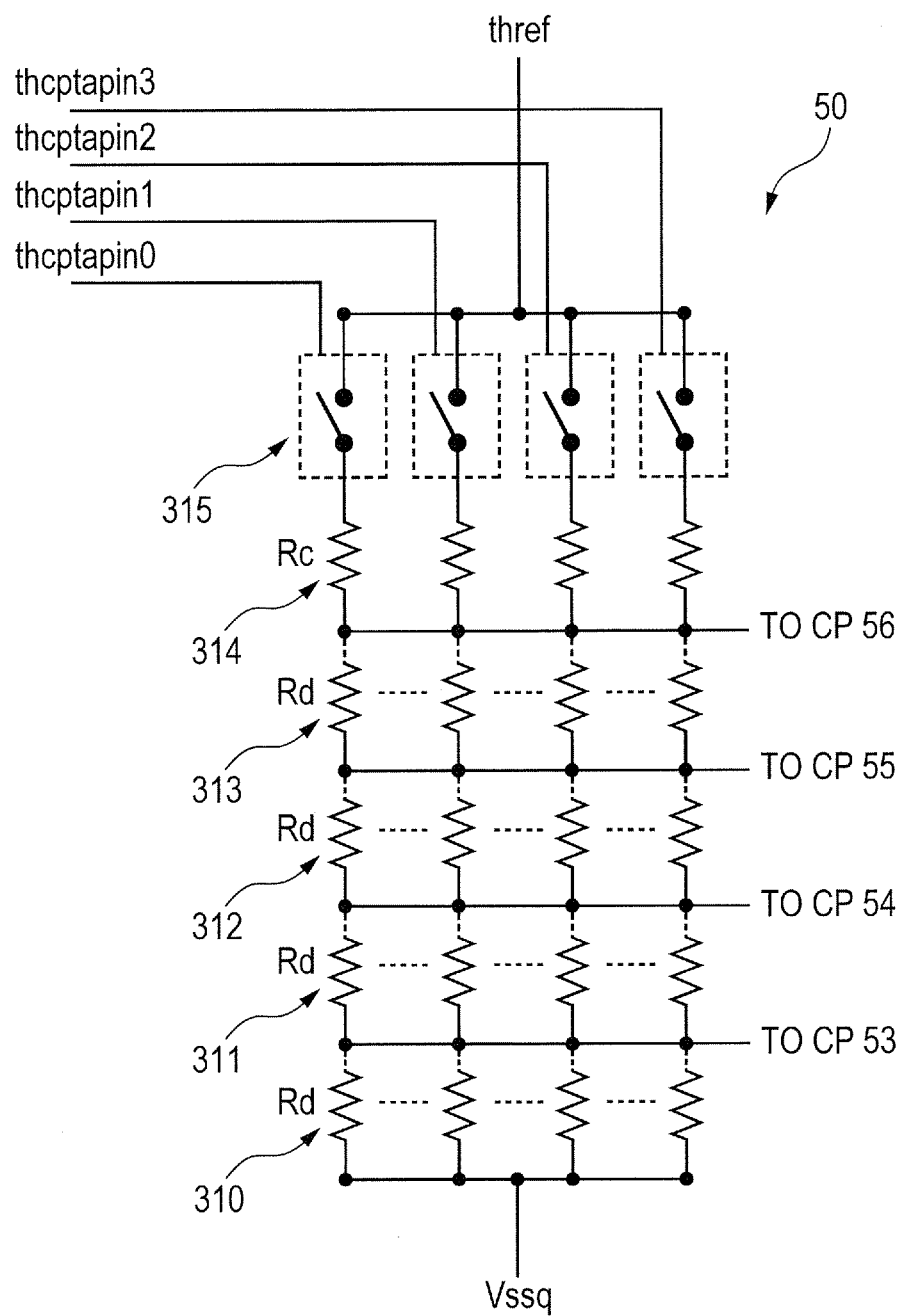
FIG. 4 is a circuit diagram showing another configuration example of the reference voltage generating circuit in the temperature sensor shown in FIG. 1.

FIG. 4 shows another configuration example of the reference voltage generating circuit 50.

The reference voltage generating circuit 50 shown in FIG. 4 includes dividing resistor groups 310, 311, 312, 313, 314, and a switch group 315 coupled in series. One terminal of the dividing resistor group 310 is coupled to the low-potential-side source voltage Vssq. The output voltage thref of the reference voltage adjustment circuit 48 is applied to one terminal of the switch group 315. The reference voltage supplied to the inverting input terminal (−) of the voltage comparator 53 is obtained from the node between the series-coupled dividing resistor groups 310 and 311. The reference voltage supplied to the inverting input terminal (−) of the voltage comparator 54 is obtained from the node between the series-coupled dividing resistor groups 311 and 312. The reference voltage supplied to the inverting input terminal (−) of the voltage comparator 55 is obtained from the node between the series-coupled dividing resistor groups 312 and 313. The reference voltage supplied to the inverting input terminal (−) of the voltage comparator 56 is obtained from the node between the series-coupled dividing resistor groups 313 and 314.

The value of each dividing resistor in the dividing resistor groups 310 to 313 is denoted by "Rd", and the value of each dividing resistor in the dividing resistor group 314 is denoted by "Rc". The value of each dividing resistor in the dividing resistor groups 310 to 314 is set so that the temperature difference by the chip temperature detection signal thcpout0-15 is 5° C. The state of the switch group 315 is controlled by the control circuit 45. The reference voltages supplied to the voltage comparators 53 to 56 can be changed by the switch control. The correspondence between the bits of the chip temperature detection signal thcpout0-15 and the chip temperature is changed by changing the reference voltages supplied to the voltage comparators 53 to 56. In this example, the chip temperature detection range can be shifted in units of 15° C. in accordance with, the state of the switch group 315. The operation of the switch group 315 is controlled by the reference voltage control signal thcptapin0-3 outputted from the control circuit 45.

Figure 5:
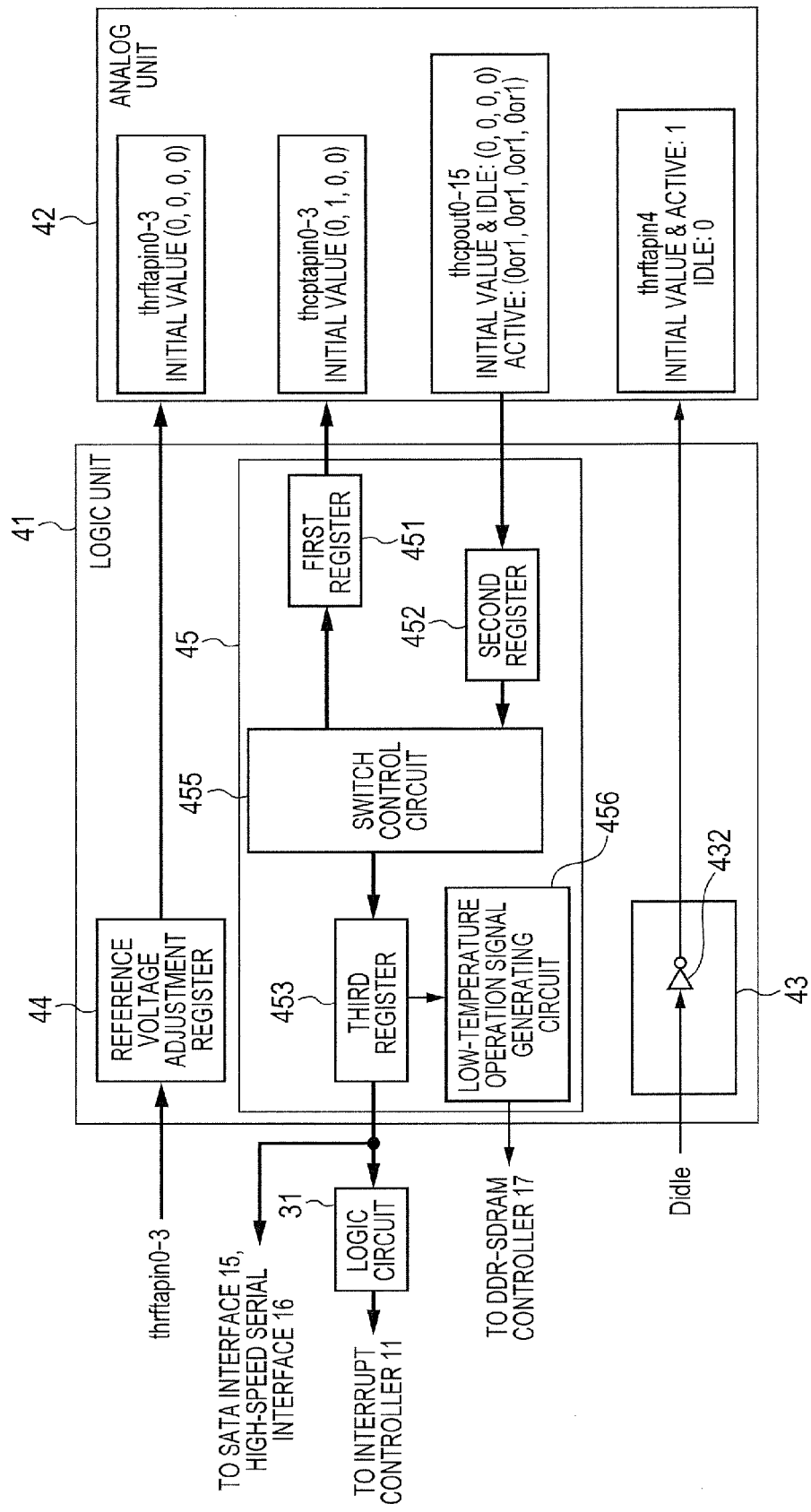
FIG. 5 is a block diagram showing a configuration example of a logic unit in the temperature sensor shown in FIG. 1.

FIG. 5 shows a configuration example of the main part of the logic unit 41.

The control circuit 45 in the logic unit 41 includes a first register 451, a second register 452, a third register 453, a switch control circuit 455, and a low-temperature operation signal generating circuit 456.

The first register 451 is configured with 4 bits, and holds the reference voltage control signal thcptapin0-3 for controlling the reference voltages. The reference voltage control signal thcptapin0-3 is sent to the reference voltage generating circuit 50. The initial value of the reference voltage control signal thcptapin0-3 is "0, 1, 0, 0". The initial value is changed in accordance with the usage environment of the LSI and temperature control necessary for modules mounted on the LSI. The chip temperature detection signal thcpout0-15 is sent to the second register 452. The second register 452 is configured with 4 bits. The switch control circuit 455 increments or decrements the reference voltage control signal thcptapin0-3 for controlling the operations of the switch groups (302, 304, 306, 308, 315) based on the chip temperature detection signal thcpout0-15 held in the second register 452. In this example, the reference voltage control signal thcptapin0-3 is incremented if the chip temperature detection signal thcpout0-15 is "1, 1, 1, 1", and the reference voltage control signal thcptapin0-3 is decremented if the chip temperature detection signal thcpout0-15 is "0, 0, 0, 0". An increment value and a decrement value are "1". By incrementing or decrementing the reference voltage control signal thcptapin0-3, the correspondence between the bits of the chip temperature detection signal thcpout0-15 and the chip temperature is changed, so that the chip temperature detection range is shifted.

Here, the shift of the chip temperature detection range will be detailed.

Figure 7:
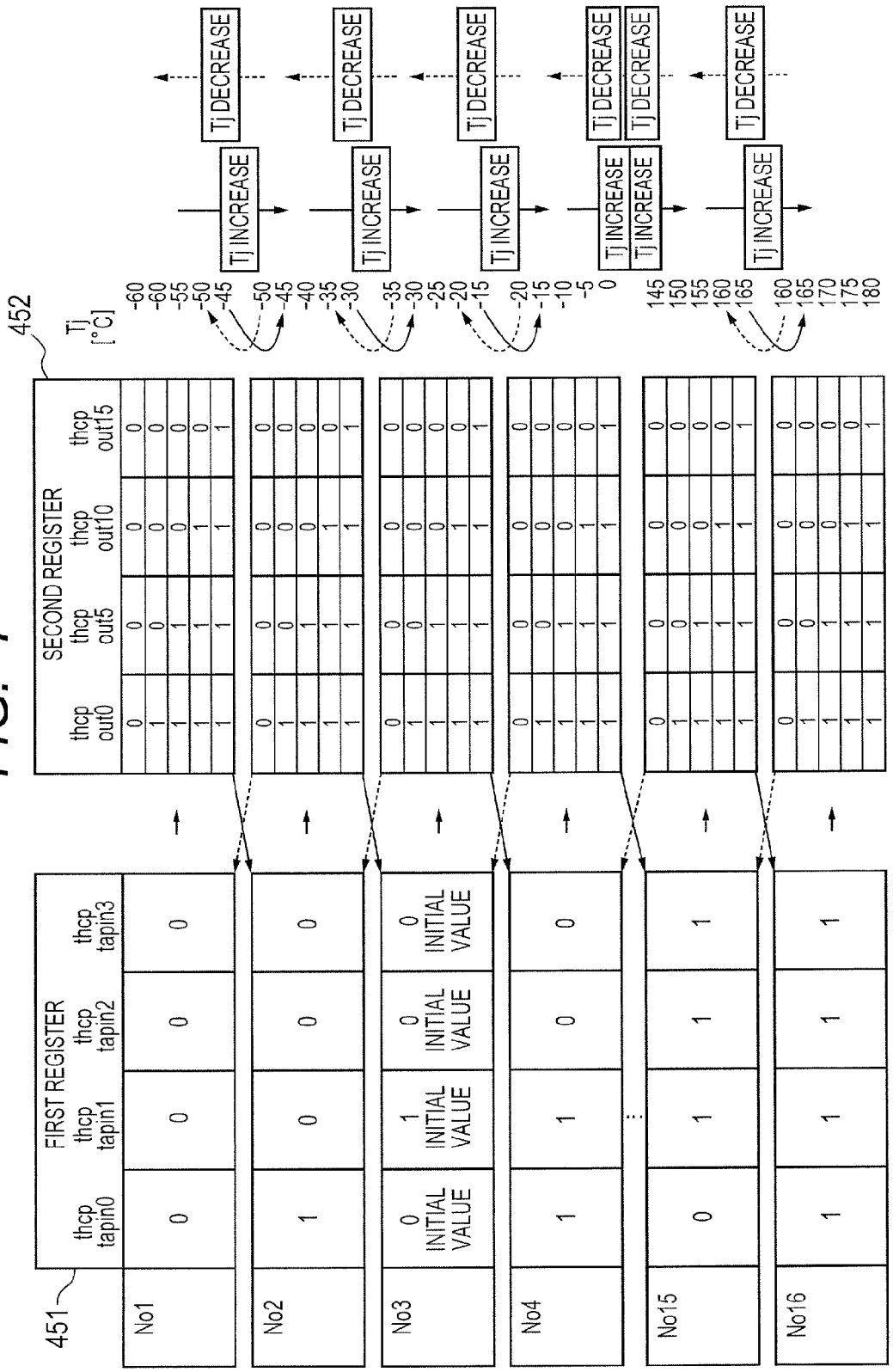
FIG. 7 is a diagram for explaining the correspondence between information held in a first register and information held in a second register in the temperature sensor shown in FIG. 1.

FIG. 7 shows the correspondence between information (thcptapin0-3) held in the first register 451 and information (thcpout0-15) held in the second register 452.

In this example, the initial value of the first register 451 is "0, 1, 0, 0". In the case where the first register 451 is "0, 1, 0, 0", the correspondence between the bits of the chip temperature detection signal thcpout0-15 written in the second register 452 and the chip temperature is as follows.

That is, in the case where the first register 451 is the initial value "0, 1, 0, 0" (No.3), thcpout0-15 "0, 0, 0, 0" indicates the chip temperature Tj=−35° C., thcpout0-15 "1, 0, 0, 0" indicates the chip temperature Tj=−30° C., and thcpout0-15 "1, 1, 0, 0" indicates the chip temperature Tj=−25° C. Further, thcpout0-15 "1, 1, 1, 0" indicates the chip temperature Tj=−20° C., and thcpout0-15 "1, 1, 1, 1" indicates the chip temperature Tj=−15° C. That is, in the case where the information held in the first register 451 is "0, 1, 0, 0", the chip temperature detection range is −35 to −15° C.

In the case where the first register 451 is the initial value "0, 1, 0, 0" (No.3), when thcpout0-15 becomes "1, 1, 1, 1", the reference voltage control signal thcptapin0-3 is incremented by the switch control circuit 455, and the information held in the first register 451 is changed to "1, 1, 0, 0". In the case where the information held in the first register 451 is "1, 1, 0, 0" (No.4), thcpout0-15 "0, 0, 0, 0" indicates the chip temperature Tj=−20° C., thcpout0-15 "1, 0, 0, 0" indicates the chip temperature Tj=−15° C., and thcpout0-15 "1, 1, 0, 0" indicates the chip temperature Tj=−10° C. Further, thcpout0-15 "1, 1, 1, 0" indicates the chip temperature Tj=−5° C., and thcpout0-15 "1, 1, 1, 1" indicates the chip temperature Tj=0° C. That is, when the first register 451 is changed from the initial value "0, 1, 0, 0" to "1, 1, 0, 0", the chip temperature detection range is shifted from "−35 to −15° C." to "−20 to 0° C.".

In the same way, when thcpout0-15 becomes "1, 1, 1, 1", the reference voltage control signal thcptapin0-3 is incremented by the switch control circuit 455, and the information held in the first register 451 is changed, so that the chip temperature detection range is shifted. For example, when the reference voltage control signal thcptapin0-3 is incremented, and the information held in the first register 451 is changed to "0, 1, 1, 1" (No.15), thcpout0-15 "0, 0, 0, 0" indicates the chip temperature Tj=145° C., thcpout0-15 "1, 0, 0, 0" indicates the chip temperature Tj=150° C., and thcpout0-15 "1, 1, 0, 0" indicates the chip temperature Tj=155° C. Further, thcpout0-15 "1, 1, 1, 0" indicates the chip temperature Tj=160° C., and thcpout0-15 "1, 1, 1, 1" indicates the chip temperature Tj=165° C. That is, in the case where the information held in the first register 451 is "0, 1, 1, 1", the chip temperature detection range is 145 to 165° C.

Further, when the reference voltage control signal thcptapin0-3 is incremented, and the information held in the first register 451 is changed to "1, 1, 1, 1" (No.16), thcpout0-15 "0, 0, 0, 0" indicates the chip temperature Tj=160° C., thcpout0-15 "1, 0, 0, 0" indicates the chip temperature Tj=165° C., and thcpout0-15 "1, 1, 0, 0" indicates the chip temperature Tj=170° C. Further, thcpout0-15 "1, 1, 1, 0" indicates the chip temperature Tj=175° C., and thcpout0-15 "1, 1, 1, 1" indicates the chip temperature Tj=180° C. That is, in the case where the information held in the first register 451 is "1, 1, 1, 1", the temperature detection range is 160 to 180° C.

In the case where the first register 451 is the initial value "0, 1, 0, 0" (No.3), when thcpout0-15 becomes "0, 0, 0, 0", the reference voltage control signal thcptapin0-3 is decremented by the switch control circuit 455, and the information held in the first register 451 is changed to "1, 0, 0, 0". In the case where the information held in the first register 451 is "1, 0, 0, 0" (No.2), thcpout0-15 "0, 0, 0, 0" indicates the chip temperature Tj=−50° C., thcpout0-15 "1, 0, 0, 0" indicates the chip temperature Tj=−45° C., and thcpout0-15 "1, 1, 0, 0" indicates the chip temperature Tj=−40° C. Further, thcpout0-15 "1, 1, 1, 0" indicates the chip temperature Tj=−35° C., and thcpout0-15 "1, 1, 1, 1" indicates the chip temperature Tj=−30° C. That is, when the first register 451 is changed from the initial value "0, 1, 0, 0" to "1, 0, 0, 0", the chip temperature detection range is shifted from "−35 to −15° C." to "−50 to −30° C.".

In the same way, when the reference voltage control signal thcptapin0-3 is decremented, and the information held in the first register 451 is changed to "0, 0, 0, 0" (No.1), thcpout0-15 "0, 0, 0, 0" indicates the chip temperature Tj<−60° C., thcpout0-15 "1, 0, 0, 0" indicates the chip temperature Tj=−60° C., and thcpout0-15 "1, 1, 0, 0" indicates the chip temperature Tj=−55° C. Further, thcpout0-15 "1, 1, 1, 0" indicates the chip temperature Tj=−50° C., and thcpout0-15 "1, 1, 1, 1" indicates the chip temperature Tj=−45° C. That is, in the case where the information held in the first register 451 is "0, 0, 0, 0", the temperature detection range is −60 to −45° C.

In this example, the control circuit 45 controls the reference voltages so that parts of chip temperature detection ranges overlap each other around the shift of the chip temperature detection range. For example, in the case where the first register 451 is changed from the initial value "0, 1, 0, 0" (No.3) to "1, 1, 0, 0" (No.4), the chip temperature detection ranges overlap at −20° C. and −15° C. around the shift of the chip temperature detection range. Similarly, in the case where the first register 451 is changed from the initial value "0, 1, 0, 0" (No.3) to "1, 0, 0, 0" (No.2), the chip temperature detection ranges overlap at −30° C. and −35° C. around the shift of the chip temperature detection range. By thus controlling the reference voltages so that parts of chip temperature detection ranges overlap each other around the shift of the chip temperature detection range, it is possible to cope with the case the chip temperature Tj changes in the direction opposite to the shift direction immediately after the shift of the chip temperature detection range. Specific examples are described below.

For example, in the case where the first register 451 is the initial value "0, 1, 0, 0" (No.3), when thcpout0-15 becomes "1, 1, 1, 1" at the chip temperature Tj=−15° C., the reference voltage control signal thcptapin0-3 is incremented by the switch control circuit 455, and the information held in the first register 451 is changed to "1, 1, 0, 0". If thcpout0-15 "0, 0, 0, 0" is assigned to the chip temperature Tj=−15° C. in the case where the information held in the first register 451 is "1, 1, 0, 0" (No.4), it is not possible to detect an actual chip temperature of Tj=−20° C.

Therefore, in the case where the information held in the first register 451 is "1, 1, 0, 0" (No.4), thcpout0-15 "0, 0, 0, 0" is assigned to the chip temperature Tj=−20° C., thcpout0-15 "1, 0, 0, 0" is assigned to the chip temperature Tj=−15° C., and thcpout0-15 "1, 1, 0, 0" is assigned to the chip temperature Tj=−10° C. That is, the chip temperature detection ranges overlap at −20° C. and −15° C. around the shift of the chip temperature detection range. Accordingly, in the case where the first register 451 is the initial value "0, 1, 0, 0" (No.3), when thcpout0-15 becomes "1, 1, 1, 1" at the chip temperature Tj=−15° C., the reference voltage control signal thcptapin0-3 is incremented by the switch control circuit 455, and the information held in the first register 451 is changed to "1, 1, 0, 0", so that the chip temperature detection range is shifted from "−35 to −15° C." to "−20 to 0° C.". Then, when the actual chip temperature becomes Tj=−20° C., thcpout0-15 becomes "0, 0, 0, 0", and the reference voltage control signal thcptapin0-3 is decremented by the switch control circuit 455; therefore, it is possible to normally detect the chip temperature.

Further, in the case where the first register 451 is the initial value "0, 1, 0, 0" (No.3), when thcpout0-15 becomes "0, 0, 0, 0", the reference voltage control signal thcptapin0-3 is decremented by the switch control circuit 455, and the information held in the first register 451 is changed to "1, 0, 0, 0". If thcpout0-15 "1, 1, 1, 1" is assigned to the chip temperature Tj=−35° C. in the case where the information held in the first register 451 is "1, 0, 0, 0" (No.2), it is not possible to detect an actual chip temperature of Tj=−30° C.

Therefore, in the case where the information held in the first register 451 is "1, 0, 0, 0" (No.2), thcpout0-15 "1, 1, 1, 1" is assigned to the chip temperature Tj=−30° C., thcpout0-15 "1, 1, 1, 0" is assigned to the chip temperature Tj=−35° C., and thcpout0-15 "1, 1, 0, 0" is assigned to the chip temperature Tj=−40° C. That is, the chip temperature detection ranges overlap at −30° C. and −35° C. around the shift of the chip temperature detection range. Accordingly, in the case where the first register 451 is the initial value "0, 1, 0, 0" (No.3), when thcpout0-15 becomes "0, 0, 0, 0" at the chip temperature Tj=−35° C., the reference voltage control signal thcptapin0-3 is decremented by the switch control circuit 455, and the information held in the first register 451 is changed to "1, 0, 0, 0", so that the chip temperature detection range is shifted from "−35 to −15° C." to "−50to −30° C.". Then, when the actual chip temperature becomes Tj=−30° C., thcpout0-15 becomes "1, 1, 1, 1", and the reference voltage control signal thcptapin0-3 is incremented by the switch control circuit 455; therefore, it is possible to normally detect the chip temperature.

While the foregoing has been described with reference to the initial value "0, 1, 0, 0" (No.3) of the first register 451, the same applies to another state of the first register 451.

The switch control circuit 455 shown in FIG. 5 increments the reference voltage control signal thcptapin0-3 when the information (thcpout0-15) held in the second register 452 is "1, 1, 1, 1", and decrements the reference voltage control signal thcptapin0-3 when the information (thcpout0-15) held in the second register 452 is "0, 0, 0, 0". Further, the switch control circuit 455 starts mask processing when the information (thcpout0-15) held in the second register 452 becomes "1, 1, 1, 1" or "0, 0, 0, 0". In the mask processing, the logic value of the signal sent from the second register 452 is fixed only during a predetermined mask period. Therefore, even if the information held in the second register 452 is updated, the update of the information held in the second register 452 is not reflected on the control of the switch control circuit 455 during the predetermined mask period. The mask period is set in consideration of a period until the first register 451 is updated and the outputs of the voltage comparators 53 to 56 become stabilized in accordance with the updated reference voltages. In this example, the mask period is set to 100 to 300 μsec. With the mask processing, it is possible to stabilize the reference voltage control signal thcptapin0-3.

The third register 453 shown in FIG. 5 holds the reference voltage control signal thcptapin0-3 and the chip temperature detection signal thcpout0-15 from the switch control circuit 455. The information held in the third register 453 is sent to the low-temperature operation signal generating circuit 456, the SATA interface 15, the high-speed serial interface 16, a logic circuit 31, and the like. The logic circuit 31 asserts an interrupt request signal to the CPU 2 when the reference voltage control signal thcptapin0-3 becomes "0, 0, 1, 1" and the chip temperature detection signal thcpout0-15 becomes "1, 1, 0, 0". The interrupt request signal as a request for interrupt processing for an excessive temperature is sent to the interrupt controller 11. The interrupt request signal to the CPU 2 is negated when the third bit (thcptapin2) from the left of thcptapin0-3 becomes the low level.

The low-temperature operation signal generating circuit 456 shown in FIG. 5 receives the reference voltage control signal thcptapin0-3 and the chip temperature detection signal thcpout0-15 from the third register 453, and generates a low-temperature operation signal based thereon. The low-temperature operation signal is configured with 4 bits. The first bit of the low-temperature operation signal is at the low level at temperatures lower than −25° C., and is at the high level at temperatures not lower than −25° C. The second bit of the low-temperature operation signal is at the low level at temperatures lower than −20° C., and is at the high level at temperatures not lower than −20° C. The third bit of the low-temperature operation signal is at the low level at temperatures lower than −15° C., and is at the high level at temperatures not lower than −15° C. The fourth bit of the low-temperature operation signal is at the low level at temperatures lower than −10° C., and is at the high level at temperatures not lower than −10° C. Thus, in the generation of the low-temperature operation signal, the reference voltage control signal thcptapin0-3 is needed along with the chip temperature detection signal thcpout0-15 so as to be able to correctly recognize the corresponding chip temperature by referring to the reference voltage control signal thcptapin0-3 even if the correspondence between the bits of the chip temperature detection signal and the chip temperature is changed by the switch control of the switch control circuit 455. The low-temperature operation signal obtained by the low-temperature operation signal generating circuit 456 is sent to the DDR-SDRAM controller 17. The DDR-SDRAM controller 17 performs a dummy operation for generating heat if −40° C.<Tj<−20° C. The symbol Tj denotes the chip temperature. The read/write of the DDR-SDRAM is disabled during the dummy operation. Then, when the chip temperature Tj exceeds −20° C. by the dummy operation, the dummy operation is stopped, and the DDR-SDRAM controller 17 performs an original control operation to enable the read/write of the DDR-SDRAM. Since the read/write of the DDR-SDRAM is performed when the chip temperature Tj exceeds −20° C., it is possible to avoid an unstable operation of the DDR-SDRAM controller 17. If the temperature does not exceed e.g. −20° C. only with the dummy operation of the DDR-SDRAM controller 17, another module is added for the dummy operation with necessary heat. When the temperature exceeds −20° C., the dummy operation is stopped, and a normal operation is performed.

The control signal input circuit 43 shown in FIG. 5 includes an inverter 432 for inverting the logic of the inputted Didle signal. The output thrftapin4 of the inverter 432 is sent to the analog unit 42.

Next, the operation of the. LSI 200 configured as above will be described.

Figure 6:
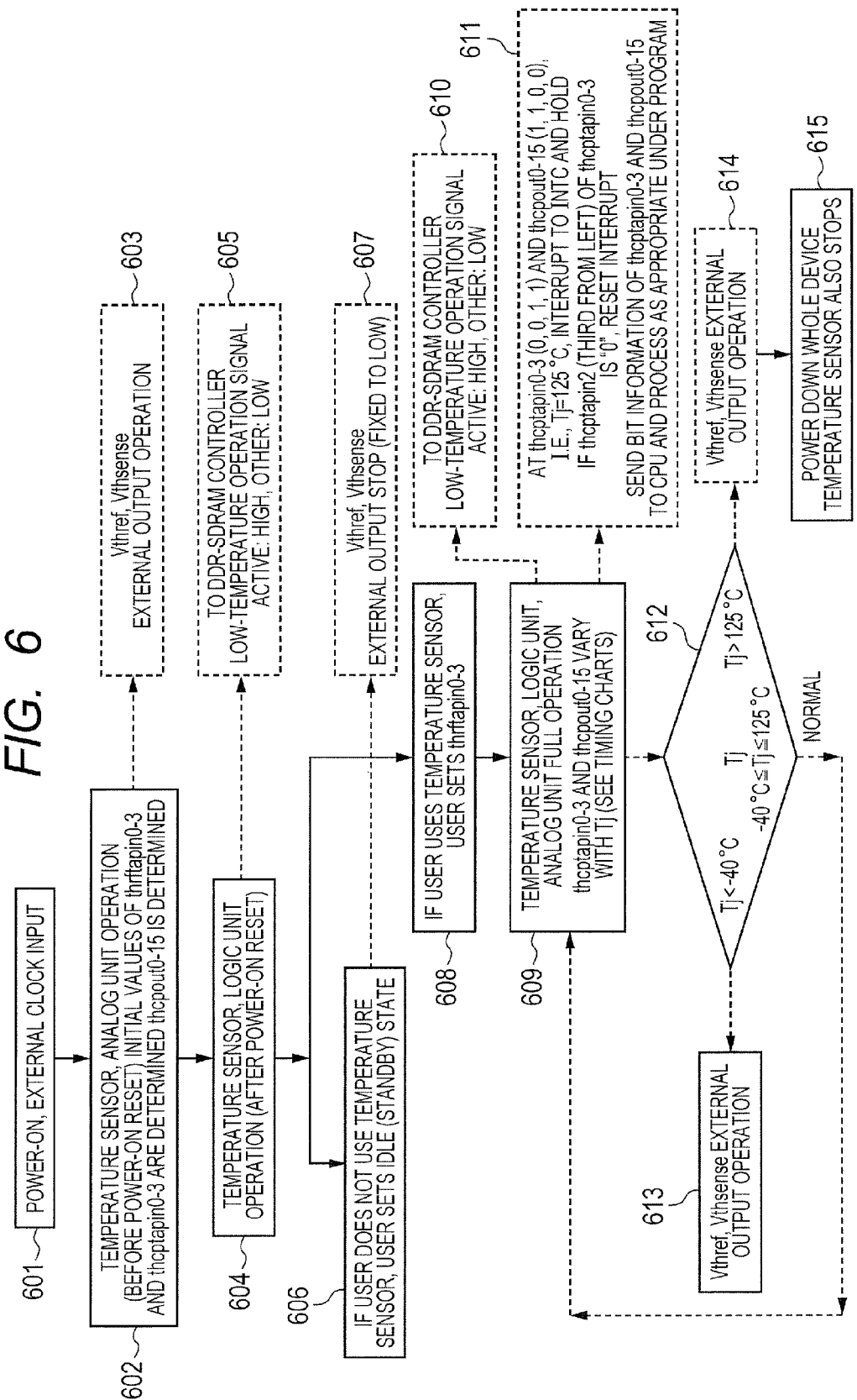
FIG. 6 is a flowchart showing operations of the main part of the LSI shown in FIG. 1.

FIG. 6 shows a flow of the operation of the main part of the LSI 200.

Before power-on reset after turning on the LSI 200 (601), in the analog unit 42 in the temperature sensor 4, the initial values of the reference voltage adjustment signal thrftapin0-3 and the reference voltage control signal thcptapin0-3 are determined (602). Further, in the analog unit 42, the temperature detection result analog signal Vthsense is outputted through the external terminal 19 from the analog output buffer 47, and the reference voltage Vthref is outputted through the external terminal 21 from the reference output buffer 49. The temperature detection result analog signal Vthsense and the reference voltage Vthref are also outputted at the time of thermal runaway of the LSI 200 (603), and are used for the control of the user system incorporating the LSI 200.

After power-on reset after turning on the LSI 200 (601), the operation of the logic unit 41 in the temperature sensor 4 starts (604). For example, the low-temperature operation signal is generated by the low-temperature operation signal generating circuit 456, and sent to the DDR-SDRAM controller 17. The low-temperature operation signal outputted from the temperature sensor 4 is at the high level if −40° C.<chip temperature Tj<−20° C. (605); accordingly, the DDR-SDRAM controller 17 performs a dummy operation for generating heat. When the chip temperature Tj exceeds −20° C., the low-temperature operation signal becomes the low level. Thereby, the DDR-SDRAM controller 17 transitions from the dummy operation to a normal operation.

In some cases, a user does not need the operation of the temperature sensor 4 (606). For example, when BIST (built-in self-test) is performed on the memory and the logic or the LSI 200 is idle, the Didle signal is asserted. The external output of the reference voltage Vthref and the temperature detection result analog signal Vthsense is stopped (607). At this time, the reference voltage Vthref and the temperature detection result analog signal Vthsense are fixed to the low level.

In the case where the user needs the operation of the temperature sensor 4, the reference voltage adjustment signal thrftapin0-3 is set (608). If the reference voltage adjustment signal thrftapin0-3 is not set, the default value "0, 0, 0, 0" is adopted.

With the operations of the logic unit 41 and the analog unit 42 in the temperature sensor 4, thcptapin0-3 and thcpout0-15 are varied in accordance with the chip temperature Tj (609).

Figure 9:
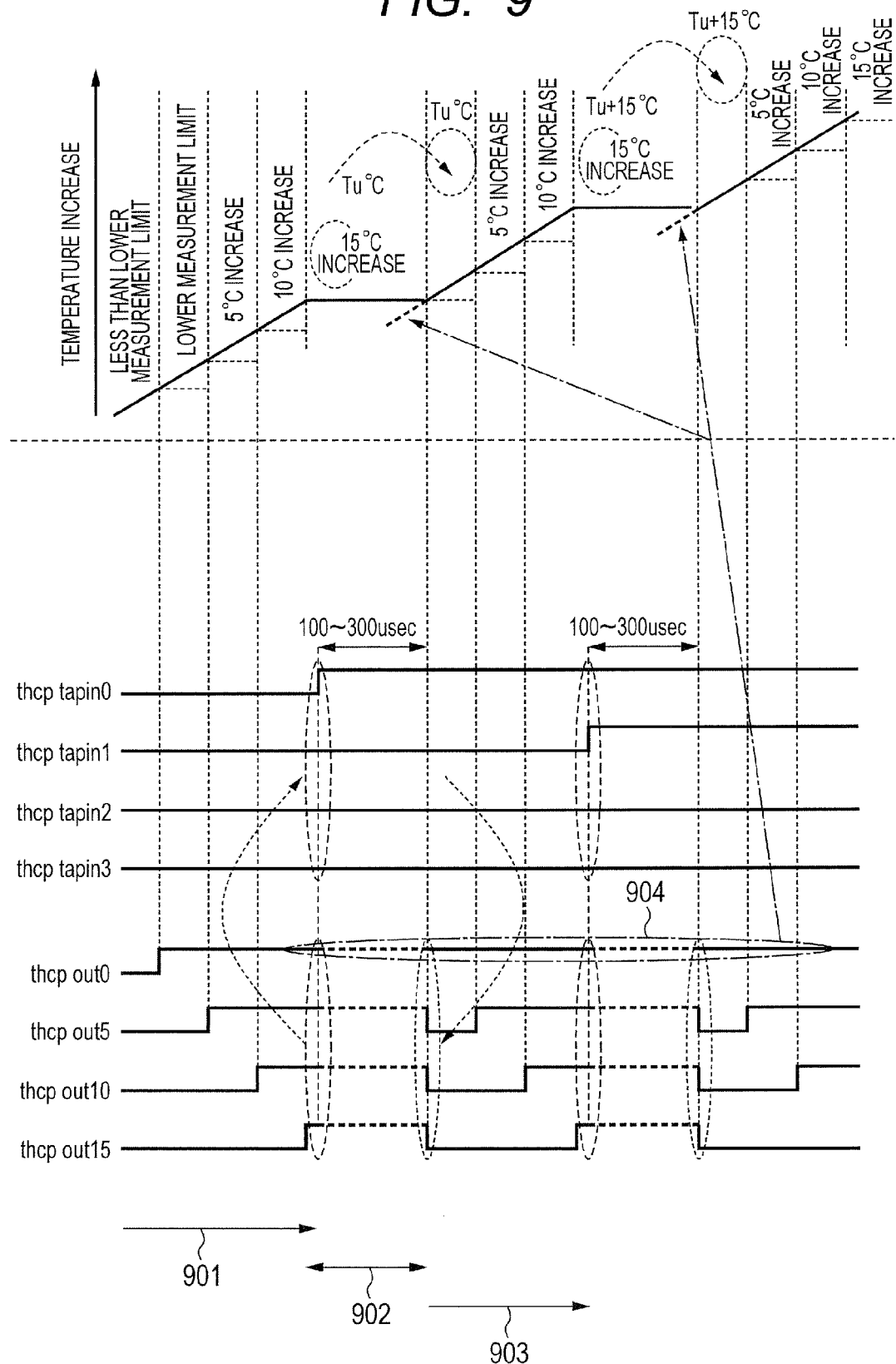
FIG. 9 is an operation timing chart during temperature increase in the temperature sensor shown in FIG. 1.

FIG. 9 shows operation timing in chip temperature increase.

For example, in a state where the reference voltage control signal thcptapin is "0, 0, 0, 0", by voltage comparison operations of the voltage comparators 53 to 56, the value of the chip temperature detection signal thcpout0-15 is updated in 5° C. increments of the chip temperature Tj (901). Then, when the chip temperature detection signal thcpout0-15 becomes "1, 1, 1, 1", the reference voltage control signal thcptapin is incremented to "1, 0, 0, 0" by the switch control circuit 455. At this time, for the stabilization of the reference voltage control signal thcptapin0-3, the output of the second register 452 is masked only for a period of 100 to 300 μsec (902). The output "1, 1, 1, 1" of the second register 452 before a mask start is held during the mask period. The mask is released after a lapse of 100 to 300 μsec from the mask start. Then, in a state where the chip temperature detection range is shifted by +15° C. (thcptapin is "1, 0, 0, 0"), again by voltage comparison operations of the voltage comparators 53 to 56, the value of the chip temperature detection signal thcpout0-15 is updated in 5° C. increments of the chip temperature Tj (903). Then, when the chip temperature detection signal thcpout0-15 becomes "1, 1, 1, 1", the reference voltage control signal thcptapin is incremented to "0, 1, 0, 0" by the switch control circuit 455. At this time, for the stabilization of the reference voltage control signal thcptapin0-3, the output of the second register 452 is masked only for a period of 100 to 300 μsec. After the mask is released, in a state where the chip temperature detection range is shifted by +15° C. (thcptapin is "0, 1, 0, 0"), again by voltage comparison operations of the voltage comparators 53 to 56, the value of the chip temperature detection signal thcpout0-15 is updated in 5° C. increments of the chip temperature Tj. In temperature increase, thcpout0 is always at the high level (logic value '1').

Figure 10:
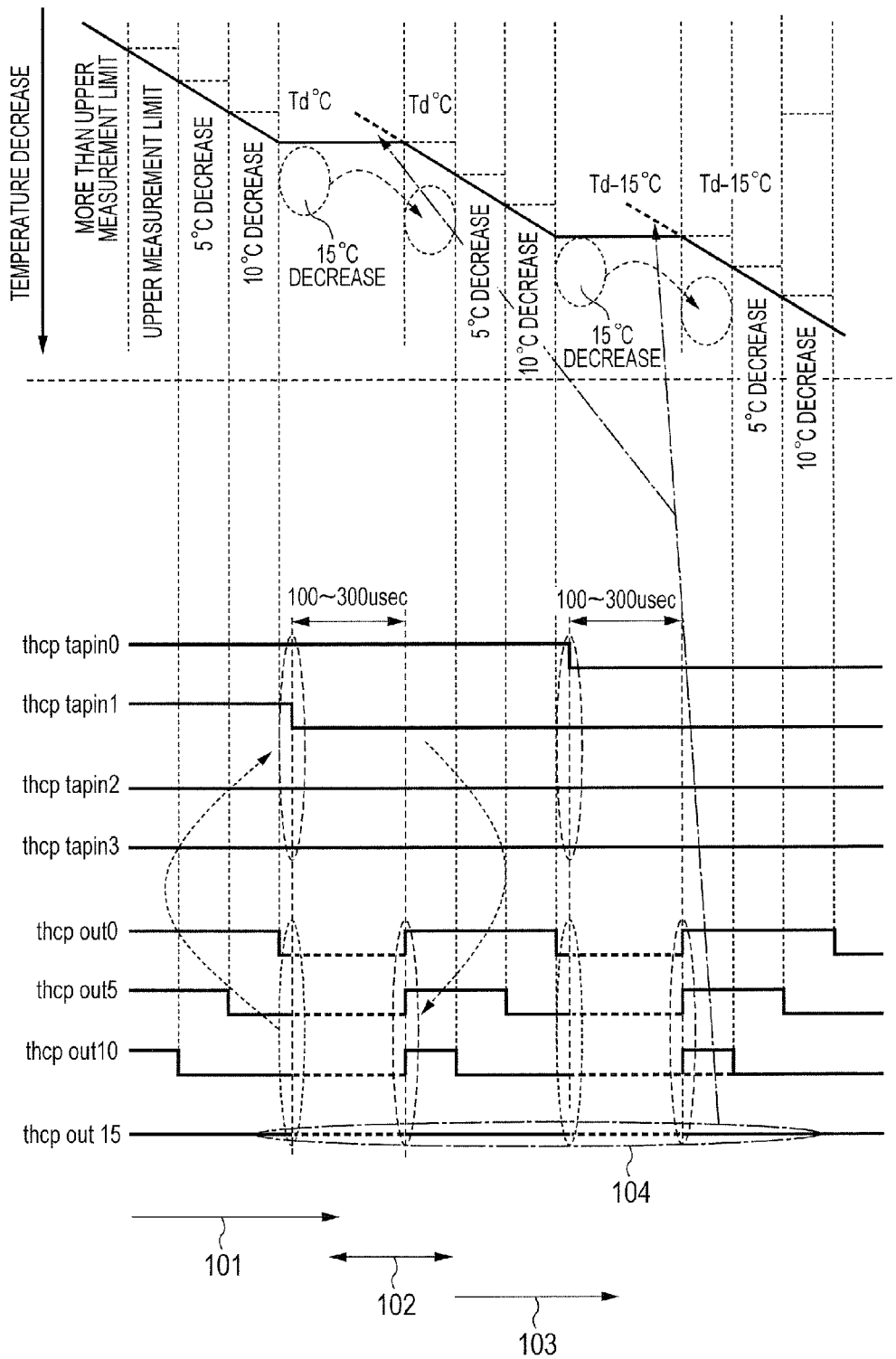
FIG. 10 is an operation timing chart during temperature decrease in the temperature sensor shown in FIG. 1.

FIG. 10 shows operation timing in chip temperature decrease.

For example, in a state where the reference voltage control signal thcptapin is "1, 1, 1, 1", by voltage comparison operations of the voltage comparators 53 to 56, the value of the chip temperature detection signal thcpout0-15 is updated in 5° C. decrements of the chip temperature Tj (101). Then, when the chip temperature detection signal thcpout0-15 becomes "0, 0, 0, 0", the reference voltage control signal thcptapin is decremented to "0, 1, 1, 1" by the switch control circuit 455. At this time, for the stabilization of the reference voltage control signal thcptapin0-3, the output of the second register 452 is masked only for a period of 100 to 300 μsec (102). The output "0, 0, 0, 0" of the second register 452 before a mask start is held during the mask period. The mask is released after a lapse of 100 to 300 μsec from the mask start. Then, in a state where the chip temperature detection range is shifted by −15° C. (thcptapin is "0, 1, 1, 1"), again by voltage comparison operations of the voltage comparators 53 to 56, the value of the chip temperature detection signal thcpout0-15 is updated in 5° C. decrements of the chip temperature Tj (103). Then, when the chip temperature detection signal thcpout0-15 becomes "0, 0, 0, 0", the reference voltage control signal thcptapin is decremented to "1, 1, 0, 0" by the switch control circuit 455. At this time, for the stabilization of the reference voltage control signal thcptapin0-3, the output of the second register 452 is masked only for a period of 100 to 300 μsec. After the mask is released, in a state where the chip temperature detection range is shifted by −15° C., again by voltage comparison operations of the voltage comparators 53 to 56, the value of the chip temperature detection signal thcpout0-15 is updated in 5° C. decrements of the chip temperature Tj. In temperature decrease, thcpout15 is always at the low level (logic value '0').

When the chip temperature Tj increases sharply or the chip temperature Tj is already sufficiently high at the time of operation of the system, the first register 451 is sequentially incremented in steps of 15° C. from the initial value "0, 1, 0, 0" (No.3) until thcptapin0-3 reaches the corresponding chip temperature detection range by thcpout0-15 "1, 1, 1, 1", without problems in circuit operation.

The operations of units in the LSI 200 are controlled based on the output signals of the temperature sensor 4.

For example, the operation of the DDR-SDRAM controller 17 is continuously controlled by the low-temperature operation signal generated by the low-temperature operation signal generating circuit 456 (610).

If an excessive temperature such as 125° C. or higher is detected by the temperature sensor 4, a predetermined interrupt request is made to the interrupt controller 11 (611).

When the CPU 2 performs interrupt processing according to the interrupt request, the supply of the source voltage to the CPU 2 (some or all cores in the case of multiple cores) from the power supply circuit disposed outside the LSI 200 is stopped. When the supply of. the source voltage to the CPU 2 is stopped, the operation of the CPU 2 (some or all cores in the case of multiple cores) is stopped, so that the chip temperature gradually decreases. If the temperature detection result by the temperature sensor 4 does not indicate an excessive temperature, the source voltage is supplied to the CPU 2 from the power supply circuit disposed outside the LSI 200. Further, the bit information of the reference voltage control signal thcptapin0-3 and the chip temperature detection signal thcpout0-15 can be sent to the CPU 2 and processed as appropriate under a program executed by the CPU 2 (611).

Further, various kinds of operation control can be performed based on the output signals of the temperature sensor 4 (612). For example, since the reference voltage Vthref and the temperature detection result analog signal Vthsense are effective at the time of thermal runaway of the LSI 200, the supply of the source voltage to the LSI 200 may be shut off outside the LSI 200 by outputting these signals to the outside of the LSI 200 (614). Further, when the supply of the source voltage to the LSI 200 is shut off outside the LSI 200, the operation of the temperature sensor 4 is also stopped (615). It is desirable that the user system incorporating the LSI 200 controls the resumption of the supply of the source voltage to the LSI 200.

Further, since the reference voltage Vthref and the temperature detection result analog signal Vthsense can be obtained also at the time of a low-temperature abnormal operation of the LSI 200, control may be performed so as to maintain the reset state of the LSI 200, using these signals (613).

Further, if a normal-temperature operation of the LSI 200 can be confirmed based on the output signals of the temperature sensor 4, the frequency of the clock signal in the LSI 200 may be increased, which can increase a processing speed in the LSI 200.

Second Embodiment

Figure 11:
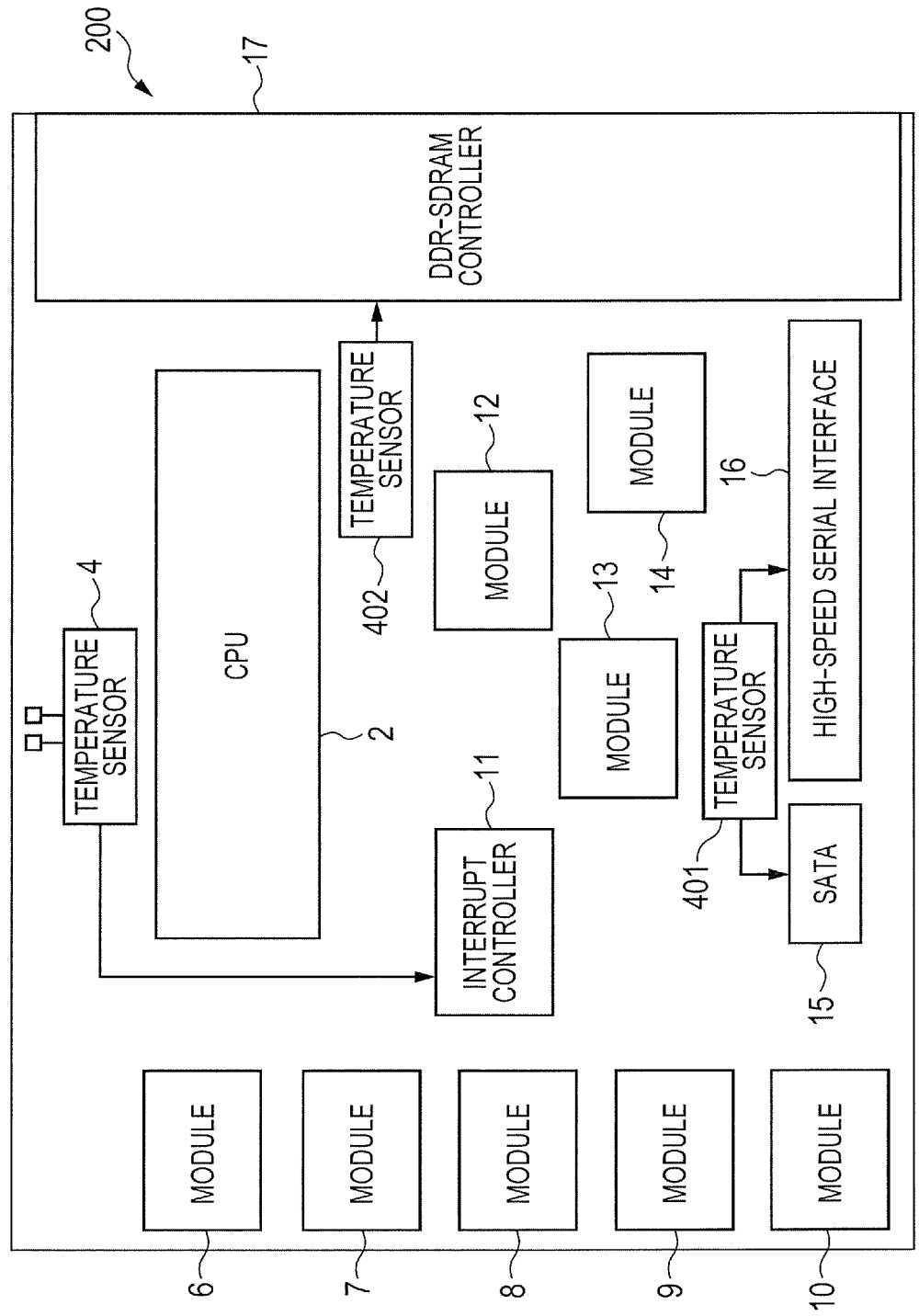
FIG. 11 is a block diagram showing another layout of the LSI as an example of the semiconductor device according to the invention.

FIG. 11 shows another configuration example of the LSI as an example of the semiconductor device according to the invention.

The LSI 200 shown in FIG. 11 differs from that shown in FIG. 2 mainly in having temperature sensors 401 and 402 besides the temperature sensor 4. The temperature sensor 401 is disposed near the SATA interface 15 and the high-speed serial interface 16, and the output signal of the temperature sensor 401 is sent to the SATA interface 15 and the high-speed serial interface 16. The temperature sensor 402 is disposed near the DDR-SDRAM controller 17, and the output signal of the temperature sensor 402 is sent to the DDR-SDRAM controller 17.

Thus, temperature sensors may be disposed near main modules to control operations thereof based on the output signals of the temperature sensors, respectively. The temperature sensors 401 and 402 have the same configuration as the temperature sensor 4. It is sufficient that only the temperature sensor 4 externally outputs the temperature detection result analog signal Vthsense and the reference voltage Vref, but the temperature sensors 401 and 402 do not need to externally output the temperature detection result analog signal Vthsense and the reference voltage Vref.

While the invention made above by the present inventors has been described specifically based on the illustrated embodiments, the present invention is not limited thereto. It is needless to say that various changes and modifications can be made thereto without departing from the spirit and scope of the invention.

For example, the temperature sensor 4 is applicable besides the LSI of Soc (System-on-a-chip). Further, in FIG. 1, the number of voltage comparators (53 to 56) is four, but is not limited thereto. The number of voltage comparators may be three or less, or may be five or more.

What is claimed is:

1. A semiconductor device comprising:
   a temperature sensor for detecting a chip temperature; and
   a module whose operation can be controlled based on an output of the temperature sensor,
   wherein the temperature sensor comprises:
   a temperature detection circuit for outputting a voltage signal according to the chip temperature;
   a reference voltage generating circuit for generating a plurality of reference voltage signals;
   a plurality of voltage comparators for comparing each reference voltage signal of the reference voltage generating circuit with the voltage signal of the temperature detection circuit and thereby generating a chip temperature detection signal configured with multiple bits; and
   a control circuit receiving the chip temperature detection signal with multiple bits and changing the reference voltages generated by the reference voltage generating circuit based directly on the received chip temperature detection signal with multiple bits, thereby changing correspondence between the chip temperature detection signal with multiple bits and the chip temperature, so as to shift a chip temperature detection range,
   wherein the control circuit changes the reference voltage signals so that portions of chip temperature detection ranges overlap each other around the shift of the chip temperature detection range.

2. The semiconductor device according to claim 1, wherein the control circuit comprises:
   a first register for holding a reference voltage control signal for controlling the reference voltages; and
   a second register for holding the chip temperature detection signal.

3. The semiconductor device according to claim 2, wherein the control circuit comprises a third register for outputting the reference voltage control signal and the chip temperature detection signal to the outside of the temperature sensor.

4. The semiconductor device according to claim 3,
   wherein the reference voltage generating circuit comprises:
   a plurality of resistors for dividing an input voltage; and
   a switch for selecting a resistor concerned in the division of the input voltage from among the resistors.

5. The semiconductor device according to claim 4, wherein the control circuit comprises a switch control circuit which increments or decrements a switch control signal for controlling an operation of the switch based on the chip temperature detection signal held in the second register.

6. The semiconductor device according to claim 5, wherein the switch control circuit has a mask function for fixing a logic value of the signal sent from the second register only during a predetermined mask period, and increments or decrements the switch control signal during the mask period.

7. The semiconductor device according to claim 6, wherein the module comprises a first module which receives the reference voltage control signal and the chip temperature detection signal through the third register and can trim an internal circuit based on the reference voltage control signal and the chip temperature detection signal.

8. The semiconductor device according to claim 7,
   wherein the control circuit comprises a low-temperature operation signal generating circuit for generating a low-temperature operation signal based on the reference voltage control signal and the chip temperature detection signal, and
   wherein the module comprises a second module which can perform a dummy operation for generating heat, in accordance with the low-temperature operation signal.

9. The semiconductor device according to claim 8, wherein the module comprises a CPU which receives the reference voltage control signal and the chip temperature detection signal through the third register, generates a predetermined interrupt signal based on the reference voltage control signal and the chip temperature detection signal, and can perform control for decreasing an operation rate in the semiconductor device in accordance with the interrupt signal.

10. The semiconductor device according to claim 9, wherein the temperature sensor comprises a reference voltage adjustment circuit for fine-adjusting the reference voltages generated by the reference voltage generating circuit in accordance with a signal provided from the outside of the temperature sensor.

11. A temperature sensor system for detecting a chip temperature of a semiconductor device, the temperature sensor system comprising:
    a temperature detection circuit for outputting a voltage signal according to the chip temperature;
    a reference voltage generating circuit for generating a plurality of reference voltage signals;
    a plurality of voltage comparators comparing each reference voltage signal of the reference voltage generating circuit with the voltage signal of the temperature detection circuit and thereby generating a chip temperature detection signal configured with multiple bits; and
    a control circuit receiving the chip temperature detection circuit with multiple bits, and changing the reference voltage signals generated by the reference voltage generating circuit based directly on the received chip temperature detection signal with multiple bits, thereby changing correspondence between the chip temperature detection signal with multiple bits and the chip temperature to shift a chip temperature detection range,
    wherein the control circuit changes the reference voltage signals so that portions of chip temperature detection ranges overlap each other around the shift of the chip temperature detection range.

* * * * *